March 18, 1958     C. W. CHILLSON ET AL     2,826,938
SPEED CHANGER
Filed Aug. 23, 1956
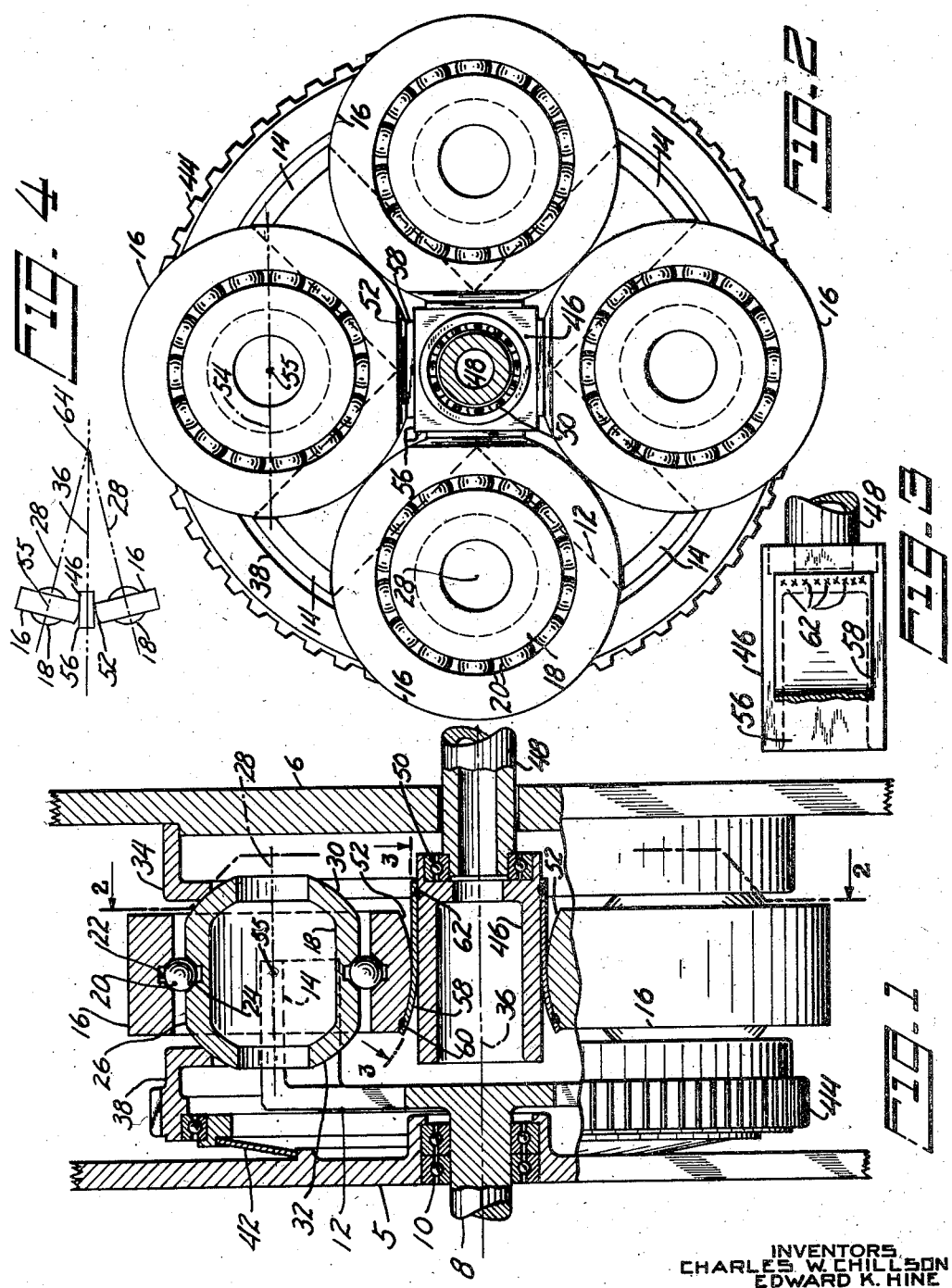
INVENTORS
CHARLES W. CHILLSON
EDWARD K. HINE
BY
ATTORNEY United States Patent Office 2,826,938
Patented Mar. 18, 1958

2,826,938

SPEED CHANGER

Charles W. Chillson, Packanack Lake, and Edward K. Hine, North Caldwell, N. J., assignors to Curtiss-Wright Corporation, a corporation of Delaware Application August 23, 1956, Serial No. 605,897

7 Claims. (Cl. 74—796)

This invention relates to infinitely variable speed changers of the type wherein planetary members having spherical surfaces are movable as to their spin axes to change the driving ratio between driving reaction and driven members. Such speed changers are disclosed in our co-pending applications Serial Number 465,500 filed October 29, 1954, and Serial Number 577,229 filed April 10, 1956. The present invention in particular provides improvements in the devices shown in the first-mentioned copending application. Objects of the present invention are to improve the ratio-changing mechanism, to improve the driving mechanism, and to improve the dynamic characteristics of the speed changer for minimizing inertia and gyroscopic effects.

The character and improvements of the invention may be understood by reading the following detailed description in connection with the annexed drawings, wherein similar reference characters represent similar parts, and wherein:

Fig. 1 is a side elevation of the speed changer, partly in longitudinal section, Fig. 2 is a section on the line 2—2 of Fig. 1, Fig. 3 is a fragmentary section on the line 3—3 of Fig. 1 and Fig. 4 is a diagram showing desired geometrical relationships of speed changer axes.

Fig. 1 shows end plates 5 and 6 comprising part of the speed changer housing, which support the mechanism. A driving shaft 8 is carried in bearings 10 in plate 5, the right end of the shaft 8, as shown, comprising a pronged driving spider 12 having driving dogs 14.

Between the dogs 14, shroud races 16 are disposed, each of which embraces a hollow member 18. The members 18 are journalled in the shroud races 16 by bearing balls 20 (spaced by suitable retainers, not shown) engaging grooves 22 and 24 respectively formed within the shroud races and on the peripheries of members 18. At shown, members 18 are cylindrically formed at 26 adjacent to the grooves 24, as these parts of the member surfaces are not active for speed changing. The shroud race 16, bearing balls 20 and race grooves 22 and 24 define a spin axis 28 for each member. The cylindrical member part 26 separates spherical parts 30 and 32 of the member. The parts 30 of the several members frictionally engage an annular race 34 secured to the end plate 6 concentrically with the axis 36 of the speed changer, the race 34 comprising a reaction member in the embodiment shown. The race 34 could, however, be mounted for rotation and be driven at any desired speed. The parts 32 of the several members frictionally engage an annular race 38 concentric with race 34 and supported on a thrust and radial bearing 40, the latter being supported and loaded toward the members 18 by a conical spring (belleville washer) 42 supported by end plate 5. The pressure exerted by spring 42 loads the races 34 and 38 into firm frictional driving engagement with members 18, and likewise urges them and the shroud races 16 inwardly toward the axis 36. The annular race 38 carries output gear teeth 44 for driving engagement with other mechanism to be driven.

On the axis 36 is a ratio shifting thimble 46 which is in the form of a prism, with a number of plane sides, each parallel to axis 36, equal to the number of members 18 and shroud races 16. The thimble 46 rotates with the shroud races on the axis 36, and is axially translatable by a shifter rod 48, the latter being connected to the thimble by a thrust bearing 50 to enable the thimble to rotate relative to the rod 48, which is not necessarily rotatable. The thimble 46 or rod 48 are restrained from tilting by suitable means, not shown, so that the axis of rotation of the thimble will always coincide with the axis 36.

Each shroud race 16 at its inside part close to the thimble 46 is formed as a segment of a cylinder 52 whose axis 54 passes transversely through the center 55 of its member 18. When the shroud races are tilted from a plane normal to the axis 36, these segments, engaging the flat faces 56 of the thimble 46 through flexible straps 58, hold the shroud races and member centers 55 at uniform distance from the axis 36. The thimble holds the spherical surfaces 30, 32 outwardly in engagement with annular races 34 and 38.

Each flexible strap 58 is welded at one end, as at 60, to its shroud race 16, and is welded at its other end, as at 62, to the flats 56 of the thimble 46. The strap is quite rigid in axial and transverse directions whereby the shroud race and thimble are held in perfect alignment. On translating the thimble 46, the strap rolls and unrolls relative to them, imparting positive tilting to the shroud races while maintaining the desired alignment.

The action of the speed changer in the configuration shown is as follows:

The shroud races are rotated bodily about the axis 36 by the spider 12; members 18, engaging the stationary annular race 34, are thereby spun on their axes 28. When the shroud races 16 are normal, as shown, the points on the member surfaces 32 which engage the annular race 38 move at the same velocity as the points on member surfaces 30 which engage the annular race 34, since such points are at the same radii from the member spin axis 28. If annular race 34 is non-rotating, the annular race 38 will not rotate. If annular race 34 rotates, race 38 will rotate at the same speed. When the shroud races and the member spin axes 28 are tilted, the member contacts with races 34 and 38 are at different radial distances from the member spin axes 28, whereby the annular race 38 is driven forward or backward, or faster or slower than race 34, depending on the angle and direction of shroud race tilt and on the rotation of race 34.

Members 18 are made hollow, as shown, to reduce their rotational inertia, which minimizes gyroscopic effect on the members, particularly when the member spin axes 28 are slanted. The hollow members enable the speed changer to be much more sensitive to speed change, and more stable and precise in its operation at any speed setting. It has been found to be comparatively easy to grind and machine normal selected bearing balls to the form shown, including drilling a hole through them along axis 28 and then machining the member hollow to the configuration shown.

The spider 12 and dogs 14 are arranged so that each dog drivably engages a corresponding shroud race 16 along the transverse shroud race axis 54. This enables drive of the shroud races in a uniform manner regardless of their tilt position, since they tilt about the axis 54.

The machining and assembly of speed changers of the sort herein disclosed requires a very high degree of precision, to enable accurate and sensitive operation and long operating life. The allowances and tolerances typical of ball bearing manufacturing are applicable for critical dimensions.

While four shroud races 16 and members 18 are disclosed, a greater or lesser number may be used. There is an optimum number for a speed changer where high power output is not dominating, as a three-member system is self-equalizing in its load distribution between members. If four members are used, as shown, closer dimensional control of components is essential to equalize load distribution between members.

Desired geometrical relationships of the speed changer for perfect operation are indicated in Fig. 4.

Assembly should be carefully accomplished so that:

A. Member spin axes 28 should all be parallel to axis 36 when the shrouds are not tilted.

B. Spin axes 28 should all intersect axis 36 at the same point when the shroud races are tilted.

Attainment of these relationships enables precision in speed changer operation, minimizes creep and wear on the member surfaces, and minimizes the effort or force required to stroke the thimble 46 for speed ratio change.

Modifications and changes may be made in the invention, as shown and described, without departing from the spirit or scope of the invention. The claims following define the limits of what constitutes the invention.

We claim:

1. A ball speed changer comprising a plurality of hollow members each having a groove therearound and spherical surfaces thereon, a shroud race embracing each member, bearing rollers between each shroud and the related member engaging the member groove, each shroud race being cylindrically formed on part of its periphery on a transverse axis normal to the spin axis of the related member, a polygonal shifter member having a plane face disposed opposite each shroud race cylindrical part, said shroud races and members being disposed around said shifter member, a flat metal strap between each shroud race and the corresponding shifter member face, secured as by spot welding, at one end to said shifter member and at the other end to said shroud race, annular race elements engaging the spherical surfaces of said members, and means to drive said shroud races in unison.

2. A ball speed changer comprising a plurality of hollow members each having a groove therearound and spherical surfaces thereon, a shroud race embracing each member, bearing rollers between each shroud and the related member engaging the member groove, each shroud race being cylindrically formed on part of its periphery on a transverse axis normal to the spin axis of the related member, a polygonal shifter member having a plane face disposed opposite each shroud race cylindrical part, said shroud races and members being disposed around said shifter member, a flat metal strap between each shroud race and the corresponding shifter member face, secured as by spot welding, at one end to said shifter member and at the other end to said shroud race, annular race elements engaging the spherical surfaces of said balls, and means to drive said shroud races in unison, said drive means comprising a spider drivably engaging said shroud races at points substantially on the axis from which said shroud race cylindrical part is struck.

3. A speed changer comprising a plurality of planetary members having spherical surfaces, a race embracing each member having bearing means engaging each member and defining a spin axis therefor passing through the member center of said spherical surfaces, means to drive said races in unison, a tilting control for said member spin axes, said control comprising an axially movable member centrally disposed between said races, and a strap for each race rigidly secured at one end to said member and at its other end to respective races, said straps being bendable in a radial direction relative to the speed changer axis and being otherwise stiff, and annular races frictionally engaging the spherical surfaces of said members.

4. A speed changer according to claim 3 wherein said members comprise thin-walled hollow shells to minimize the rotational inertia thereof.

5. A speed changer according to claim 3 wherein said annular races are at opposite ends of said members and bear thereon to press said members and races inwardly toward the speed changer axis.

6. A speed changer according to claim 4 wherein said straps lie between said races and said axially movable member, and are pressed therebetween and against said member by the inward pressure on said member races.

7. A speed changer according to claim 3, wherein said axially movable member floats and is centrally piloted on the speed changer axis by the engagement of said members with said annular races, said member acting as a load equalizer between said several member and race assemblies.

References Cited in the file of this patent

FOREIGN PATENTS 118,064     Switzerland             Dec. 16, 1926